July 12, 1966   M. J. PLUMER   3,260,502
BUTTERFLY VALVE
Filed April 14, 1958
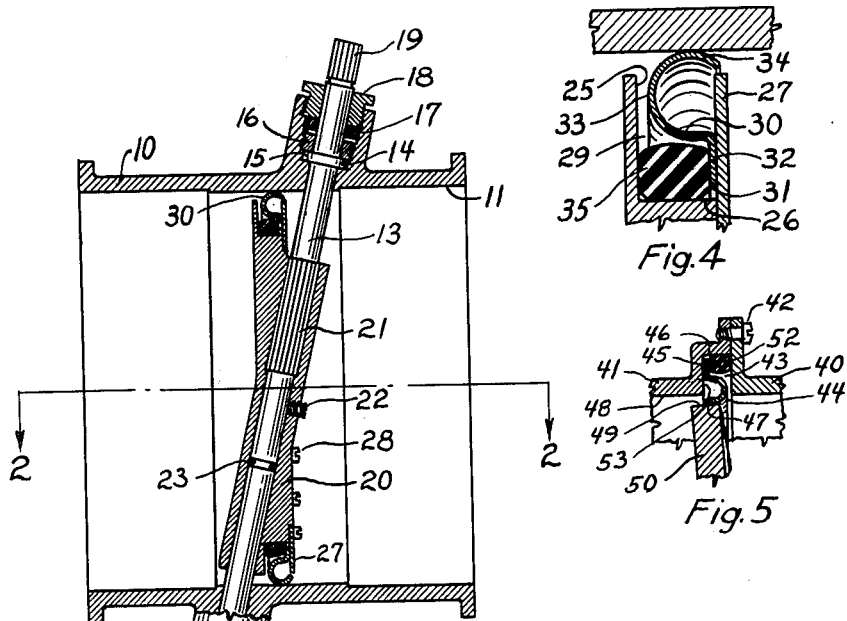
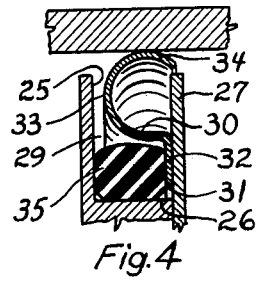
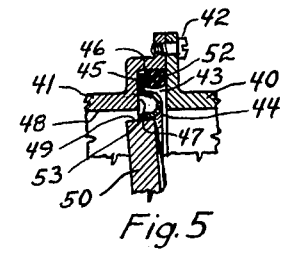
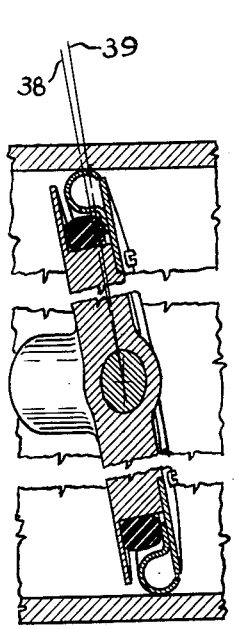
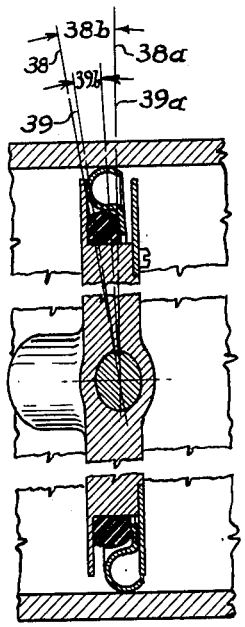
INVENTOR.
MARK J. PLUMER
BY John N. Wolfram
ATTORNEY

United States Patent Office 3,260,502
Patented July 12, 1966

3,260,502
BUTTERFLY VALVE
Mark J. Plumer, Hollywood, Calif., assignor to Parker-Hannifin Corporation, Cleveland, Ohio, a corporation of Ohio
Filed Apr. 14, 1958, Ser. No. 728,239
22 Claims. (Cl. 251—306)

This invention relates to valves of the butterfly type and more particularly to the means for establishing a seal between the valve housing and the movable valve member when the latter is in closed position.

In valves of this type it is a common practice to use a packing ring to seal the butterfly against the housing when little or no leakage can be tolerated in the intended installation. For many installations it is preferable to use a metal packing ring so as to avoid the pinching and rapid wear experienced with nonmetals. Furthermore it is desirable that the metal packing ring be relatively flexible so as to readily conform to the part it seals against, and also that it be continuous so that there is no problem of sealing splits or joints between segments.

When a metal packing ring is mounted on the movable valve closure member for sealing against the valve bore, it is not practical to machine the packing ring to an exact fit and therefore it is preferable to make it initally of a diameter slightly larger than the bore and so form it that it will flex or yield radially to fit within the bore and exert a sealing pressure thereagainst. Even though the ring may have a thin cross section and be readily flexible, the very fact that it is continuous makes it inherently highly resistant to a reduction in its circumferential length. Thus when moving toward closed position within a valve bore, a continuous metal ring of thin relatively flexible section will quite readily flex and conform itself to the bore at various points about its circumference until nearly complete bore closing contact is obtained. As the ring moves into such full contact, forces are set up for reducing the circumference of the ring and since the ring is continuous it strongly resists such reduction. As a result, the ring becomes tightly wedged in the bore with very little additional turning of the closure member. Such additional turning requires rapidly increasing torque input and also results in scoring or other damage to the parts because of the excessive contact pressure between the ring and the bore wall. Such detrimental effects may be avoided by stopping the turning movement of the closure member at a precise angular position, but this becomes impractical in many instances.

Thus, when motor operation of the valve is employed, as is the case in most aircraft applications, stopping of the motor may be accomplished by actuation of a switch when the operator shaft for the valve has been rotated to a predetermined angular position. If the position of the switch is not precisely adjusted the motor may shut off before the valve is completely closed, or on the other hand, it may not be shut off before the valve becomes tightly wedged and causes damage to the motor or other actuator parts. Overly tight wedging may also cause the seal to score the housing with consequent leakage and possible freezing of the parts in closed position.

The present invention seeks to minimize or avoid these problems by providing a continuous sealing ring for a butterfly valve in which the ring is bodily shiftable in a transverse direction upon the closure member whereby the permissible rotary movement of the closure member from fully closed position to a position in which excessive resistance to further turning is encountered is greater than when the ring is not so shiftable.

Another object of the invention is to provide a butterfly valve with a continuous flexible metal sealing ring which is bodily shiftable in radial directions so as to be self centering during closing movement of the valve closure member and thus tend to equally distribute contact pressure between the ring and housing on opposite sides of the bore.

It is another object to provide a sealing ring as above described which is loosely mounted on its supporting member for radial and transverse shifting thereon and in which a means is provided for sealing the ring with respect to the supporting member to prevent the passage of fluid therebetween.

It is another object to provide a sealing ring for a butterfly valve which ring is loosely mounted on a supporting member for radial and transverse movement thereon and in which there is a separate resilient packaging to seal the ring with respect to the supporting member, and in which means are provided to prevent blowout of the packing from a groove in which it is contained.

Other objects of the invention are apparent from the following detailed description, and from the drawings, in which:

FIGURE 1 is a longitudinal cross sectional view of a preferred form of the valve with the butterfly in closed position.

FIGURE 2 is an enlarged fragmentary cross sectional view along the lines 2—2 of FIGURE 1 and showing the butterfly in a position where initial full closing contact with the bore is obtained.

FIGURE 3 is a view similar to FIGURE 2 but showing the parts after additional closing movement has been applied.

FIGURE 4 is an enlarged fragmentary sectional view showing the sealing ring in more clear detail.

FIGURE 5 is a fragmentary section view illustrating an optional form of the invention in which the sealing ring is supported by the valve housing.

As shown in FIGURE 1, the valve housing 10 has a bore, generally designated as 11, therethrough. The bore preferably has a slightly reduced diameter portion 12 therein to provide a sealing surface. The reduced portion 12 is of relatively short length and may be to closer dimensional tolerance and better surface finish than the end portions of the bore 11.

A valve operating shaft 13 extends across the valve bore and is suitably journaled at its opposite ends in the valve housing. The shaft may have a collar or abutment member 14 thereon for holding the shaft in a fixed axial position between an abutment 15 in the body and a retainer member 16. The shaft may be sealed by a suitable packing 17 retained by a gland 18.

The shaft has a spline 19, or other suitable means, for attachment to a motor drive unit or some other means for turning the shaft.

The axis of the shaft passes through the axis of the bore portion 12 and, as shown in FIGURE 1, passes through the bore in a slanted position, the purpose for which will hereinafter be described.

A circular closure member 20 is positioned within the valve bore and is attached to the shaft 13 for rotary movement therewith by means of a spline connection 21. A set screw 22 may be employed for fixing the closure member 20 longitudinally of the shaft. This is preferably accomplished by tightening the set screw 22 after the retainer 16 has been assembled to the valve for fixing the longitudinal position of the shaft. A sealing ring 23 may be employed for preventing leakage along the shaft from one side of the closure member 20 to the other.

The closure member 20 is circular and has a rabbet, constituted by a side wall 25 and a bottom wall 26, formed about its periphery. A plate 27 is attached to the closure member 20 by means of screws 28 and opposite the side wall 25 so as to convert the rabbet into an annular groove 29.

As seen more clearly in FIGURE 4, a continuous metal sealing ring 30 is located within the groove 29 and has an internal diameter 31 which is larger than the diameter of the groove bottom 26 so that the ring 30 is bodily shiftable in radial directions within the groove. The sealing ring 30 is formed of thin metal so as to be relatively flexible. It is preferably formed with a radially extending flat section 32 and an open convolution 33 having a generally transversely extending rim 34. The rim is preferably curved in radial cross section so as to engage in line contact with the valve bore. Because of the thinness of the ring the rim 34 will flex radially inwardly with compartive ease when contacting the bore at substantially less than the entire circle of its periphery. The rim 34 is initially formed with a maximum diameter, when unconfined in the valve bore, slightly larger than the diameter of the bore portion 12. Thus, for a bore of three-inch diameter, the initial diameter of the rim 34 may be on the order of 3.010 inches.

The width of the sealing ring 30 is such that when the flat portion 32 is against the plate 27, the closed end of the convolution 33 will be spaced a substantial distance from the groove sidewall 25. The sealing ring 30 is normally urged toward a position against the plate 27 by a packing ring 35, which may be of rubber or other resilient or deformable material. The packing 35 makes sealing contact with the ring 30 and the closure member 20 so as to prevent leakage of fluid therebetween, but it will permit substantial radial and transverse movement of the sealing ring 30, as well as pivoting movement. The convolution in the ring 30 overlies the packing ring 35 a substantial extent to prevent the latter from being forced out of the groove 29 by fluid pressure.

The parts are so formed that when the sealing ring 30 is against the plate 27 the plane containing the circle of largest diameter of the rim 34 will substantially pass through the point of intersection of the longitudinal axis of the shaft and the axis of the bore portion 12. The longitudinal axis of the shaft 13 is slanted sufficiently with respect to the general plane of the closure member 20 that the ends of the shaft will be laterally spaced from the groove 29 and thus the ring 30 may be a continuous circle.

When the closure member 20 is in open position, the sealing ring 30 is urged toward a position against the plate 27 by the packing 35. Since the rim 34 is initially of larger diameter than the bore portion 12, it will be flexed radially inwardly by contact with the bore 12 to a smaller diameter adacent the ends of a shaft 13 when the closure member is in open position. To compensate for this radial contraction of the portions of the rim in contact with the bore, other portions of the rim which are out of contact will expand slightly in diameter so that the circumference of the rim 34 tends to remain substantially constant prior to the time that the valve is fully closed.

As closing movement begins, the contact lines between the rim 34 and the bore 12 on the opposite sides of the bore and adjacent the ends of the shaft 13 will gradually lengthen and leave decreasing amounts of the rim 34 out of contact with the bore 12. During such closing movement the sealing ring 30 may bodily shift in radial directions within the groove 29 to center itself within the bore to substantially equalize the contact pressure at corresponding opposite sides of the bore.

Complete circular line sealing contact between the rim 34 and bore 12 will be established when the radial line 39, shown in FIGURE 2, from the intersection of the axes of the shaft 13 and bore 12 and passing through the contact point of the rim 34 and bore 12 in the plane of FIGURE 2 approaches a position at right angles to the bore 12. At this time another radial reference line 38 from the intersection of the axes of shaft 13 and bore 12 and parallel to the general plane of the closure member 20 is slightly behind line 39, as shown.

Once such complete circular line sealing contact has been established, further movement of the ring 30 toward closed position tends to reduce the circumference of the rim 34. Since the latter is a continuous circle, reduction of the circumference requires considerable force and hence considerable contact pressure between the rim 34 and the bore 12. This contact pressure increases very rapidly as further turning movement is applied to the ring. In order to reduce or discontinue turning movement of the ring 30 without necessarily discontinuing turning movement of the closure member 20 and shaft 13, the ring 30 is mounted so that portions of it can either pivot or bodily shift transversely within the groove 29 or undergo a combination of such pivoting and bodily shifting.

Upon further turning movement of the closure member 20 from the position shown in FIGURE 2, the sealing ring portion shown in the upper part of FIGURE 3 is held back by frictional contact with the bore 12 so that it does not advance to the same extent from the FIGURE 2 position as does the adjacent portion of the closure member. Thus, the radial line 39 through the contact point with the bore 12 moves through a relatively small angle 39b from the position shown in FIGURE 2 to that shown in FIGURE 3, while at the same time the closure member reference line 38 moves through a relatively greater angle 38b to the position at 38a in FIGURE 3. This difference in angular movement is due to the fact that this portion of the ring 30 has shifted bodily within the groove 29 in a transverse direction, and to some extent has also pivoted or canted. Such movement within the groove is limited by contact of the closed end of the convolution 33 with the adjacent side wall 25 of the groove.

On the opposite side of the closure member, the portion of the ring 29 shown in the lower part of FIGURE 3 remains in position against the plate 27 while the closure member 20 is moving from the FIGURE 2 to the FIGURE 3 position, but will pivot or cant slightly as shown with the result that the contact point between the rim 34 and the bore 12 will likewise advance angularly a smaller amount from its position in FIGURE 2 than will an adjacent point on the closure member 20.

The transverse movement of the ring 30 within its groove 29 by bodily shifting and pivoting as above described results in greater latitude in the setting of external means for discontinuing rotation of the shaft 13 upon reaching closed position since the closure member may be stopped at any angular position within the angle 38b, whereas without such transverse movement rotation of the shaft would have to discontinue when the closure member is within the smaller angle 39b if the same range of torque input to the shaft is to be maintained.

FIGURE 5 is a fragmentary cross section view of a modification in which the flexible thin metal sealing ring is supported by a groove in the valve housing instead of in the closure member. Thus, the housing may be formed in two parts 40 and 41 joined by screws 42, or other suitable means, and forming an inwardly opening groove 43 therebetween. The flexible metal sealing ring 44 is mounted within the groove 43 and has a flat radial portion 45 of smaller external diameter than the diameter of the groove bottom 46.

The ring 44 has a convolution open on one end with a generally transversely extending rim 47 projecting a slight distance into the bore 48 of the housing. This rim 47 is initially slightly smaller in diameter than the outer diameter 49 of a rotary closure member 50. A resilient packing ring 52 normally maintains the sealing ring 44 in the position shown in FIGURE 4 with the flat radial portion 45 against the groove side wall 53. The closed end of the convolution of ring 44 is normally spaced a substantial distance from the groove side wall 54.

As shown in FIGURE 5, the closure member 50 has been rotated toward closed position to a point where complete sealing contact with the ring 44 has just been obtained. Further turning movement of the closure member 50 will cause portions of the ring 44 to move transversely and to pivot within the groove 43 in a manner similar to that shown in FIGURE 3. The net result of such transverse and pivoting movement is to permit a greater amount of turning movement of the closure member 50 from the position where excess force for continued movement is required. In this instance, excessive force for continued movement of the closure member is brought about by the fact that the ring 44 must be stretched to a larger circumference, rather than compressed to a smaller circumference, as is the case with the ring 30 of the preferred form of the invention. The direction of fluid flow through the housing 10 is from right to left, as viewed in FIGURE 1.

I claim:

1. A butterfly valve comprising a body having a bore therethrough, a closure member within said bore, means for rotating said member to bore opening and bore closing positions, a continuous flexible sheet metal sealing member loosely mounted on said closure member for bodily movement in radial and transverse directions with respect to said closure member, said sealing member being circular and having an initial diameter slightly greater than the diameter of said bore and being radially contracted by the bore into sealing engagement therewith when the closure member is in bore closing position, and means for establishing a seal between said sealing member and said closure member in all positions of said sealing member to prevent the passage of fluid therebetween.

2. A butterfly valve comprising a body having a bore therethrough, a closure member within said bore, means for rotating said closure member to bore opening and bore closing positions, said closure member having a groove at its periphery, a continuous flexible metallic sealing ring within said groove, said ring being circular and the inner diameter of said ring being greater than the diameter of the groove bottom whereby said ring may shift bodily in radial directions for self alignment within said bore, said ring having a convolution formed therein, said convolution being open on one end and closed on the other, the outer portion of the convolution constituting an arcuate rim, the largest diameter of which is initially slightly larger than the diameter of the bore, said rim being engageable in line contact with said bore and being radially contracted by such contact so as to conform to the bore and seal the same when the closure member is in bore closing position, a separate packing ring of rubberlike material within said groove and deformed into sealing contact with said closure member and said sealing ring, said packing ring normally urging said sealing ring toward one side wall of the groove, the other side wall of the groove being normally spaced from the closed end of the convolution, at least a circumferential section of said sealing ring being bodily movable toward said other side wall by contact with the bore during closing movement of the closure member, said bodily movement being limited by contact of the closed end of the convolution with said other side wall.

3. A butterfly valve comprising a body member having a bore therethrough, a closure member within said bore, means for rotating said closure member to bore opening and bore closing positions, a continuous and flexible sealing ring formed of sheet material and directly mounted loosely on one of said members so as to be bodily shiftable in directions both radially and axially of said ring, said ring being adapted to make sealing contact about its entire periphery with the other of said members when the valve is closed, and resilient packing means establishing a seal between said sealing ring and said one of said members in all positions of said sealing ring to prevent the passage of fluid therebetween.

4. A butterfly valve comprising a body member having a bore therethrough, a closure member within said bore, means for rotating said closure member to bore opening and bore closing positions, an annular groove in said body member and surrounding said bore, a continuous and flexible sealing ring directly and loosely mounted in said groove so as to be bodily shiftable in directions both radially and axially of said ring, said ring having a thin, flexible generally transversely extending rim projecting into said bore and adapted to make sealing contact with the periphery of the closure member when the latter is in closed position, and means for establishing a seal between said ring and said body member to prevent the passage of fluid therebetween.

5. A butterfly valve comprising a body having a bore therethrough, a closure member within said bore, means for rotating said closure member to bore opening and bore closing positions, said closure member having a groove at its periphery, a continuous and flexible sealing ring, said sealing ring being formed of thin metal and including an inner flat annular portion and a outer open convolution, said open convolution presenting a rim extending transversely of the plane of said closure member, said rim having a continuous generally circular portion of slightly greater initial diameter than the diameter of said bore, said rim portion being radially contractible by contact with said bore to closely fit and seal said bore when said closure member is in a bore closing position, said inner annular portion having an internal diameter greater than the diameter of the bottom of said groove so as to permit the bodily shifting of said sealing ring in radial directions, said groove being at least several times as wide as said inner annular portion, and a resilient packing ring seated in the bottom of said groove in compressive engagement with a side wall of said groove and an inner part of said inner annular portion to form a seal between said sealing ring and said closure member and at the same time permitting bodily movement of said sealing ring radially of said closure member and transversely of the plane of said closure member.

6. A valve in accordance with claim 5 in which said convolution has an open end and a closed end, said convolution closed end being opposed to and spaced from said one groove side wall a substantial distance, and said convolution closed end is engageable with said one groove side wall to limit said transverse movement.

7. A valve in accordance with claim 5 in which said convolution has an open end and a closed end, said convolution closed end being opposed to and spaced from said one groove side wall a substantial distance, and said convolution open end being disposed outwardly of said closure member at one face of said closure member, whereby tilting of said rim away from said one groove side wall is permitted.

8. A valve in accordance with claim 5 in which said convolution has an open end and a closed end, said convolution closed end being opposed to and spaced from said one groove side wall a substantial distance, said convolution being generally offset from the plane of said inner annular portion in the direction of said one groove side wall, a major portion of said convolution being disposed within said groove and overlying said packing ring to retain said packing ring within said groove, and said convolution closed end is engageable with said one groove side wall to limit said transverse movement.

9. A butterfly valve comprising a body having a bore therethrough, a closure member within said bore, means for rotating said member to bore opening and bore closing positions, a continuous and flexible sealing ring formed of sheet material and mounted loosely on said closure member so as to be bodily shiftable thereon in radial directions for self alignment within said bore, said ring including an outer rim extending generally transverse to the plane of the closure member, said rim including an uninterrupted generally circular portion of slightly greater initial diameter than the diameter of said bore, said rim portion being radially contractible by contact with said bore to closely fit and seal the same when said closure member is in bore closing position, and means for establishing a seal between said ring and said closure member to prevent the passage of fluid therebetween.

10. A butterfly valve comprising a body having a bore therethrough, a closure member within said bore, means for rotating said member to bore opening and bore closing positions, a continuous and flexible sealing ring formed of sheet material and mounted loosely on said closure member so as to be bodily shiftable thereon in radial directions for self alignment within said bore, said ring including an outer rim extending generally transverse to the plane of the closure member, said rim including an uninterrupted generally circular portion of slightly greater initial diameter than the diameter of said bore, said rim portion being radially contractible by contact with said bore to closely fit and seal the same when said closure member is in bore closing position, and means for establishing a seal between said ring and said closure member to prevent the passage of fluid therebetween, said closure member having an annular groove formed therein, said means for establishing a seal between said sealing ring and closure member comprising a separate resilient packing ring located within the groove, and a portion of said sealing ring overlying said packing ring for retaining the latter within the groove, said sealing ring portion normally being spaced from said packing ring, and said sealing ring having a flat annular portion engaged with said packing ring.

11. A butterfly valve comprising a body having a bore therethrough, a closure member within said bore, means for rotating said member to bore opening and bore closing positions, a continuous and flexible sealing ring formed of sheet material and mounted loosely on said closure member so as to be bodily shiftable thereon in radial directions for self alignment within said bore, said ring including an outer rim extending generally transverse to the plane of the closure member, said rim including an uninterrupted generally circular portion of slightly greater initial diameter than the diameter of said bore, said rim portion being radially contractible by contact with said bore to closely fit and seal the same when said closure member is in bore closing position, and means for establishing a seal between said ring and said closure member to prevent the passage of fluid therebetween, said closure member having an annular groove at its periphery, said means for establishing a seal between said sealing ring and closure member comprising a separate resilient packing ring of rubber like material located within the groove, said rim being a part of an open convolution formed in said sealing ring, and said convolution overlying said packing ring for retaining the latter within the groove, said convolution normally being spaced from said packing ring.

12. A butterfly valve comprising a body having a bore therethrough, a closure member within said bore, means for rotating said member to bore opening and bore closing positions, a continuous and flexible circular sealing member formed of sheet material and mounted loosely on said closure member so as to be bodily shiftable thereon in radial directions for self alignment within said bore, said sealing member including an outer rim extending generally transversely of the plane of the closure member and adapted to sealingly engage said bore when said closure member is in bore closing position and an inner annular closure member sealing portion, and means for establishing a seal between the closure member sealing portion of said sealing member and said closure member to prevent the passage of fluid therebetween.

13. A butterfly valve comprising a body having a bore therethrough, a closure member within said bore, means for rotating said member to bore opening and bore closing positions, a continuous and flexible circular sealing member formed of sheet material and mounted loosely on said closure member so as to be bodily shiftable thereon in radial directions for self alignment within said bore, said sealing member including an outer rim extending generally transversely of the plane of the closure member and adapted to sealingly engage said bore when said closure member is in bore closing position and an inner annular closure member sealing portion, and means for establishing a seal between the closure member sealing portion of said sealing member and said closure member to prevent the passage of fluid therebetween, said closure member being provided with an annular groove at its periphery, said sealing member being within said groove with said rim extending therefrom, and said groove being at least several times wider than the thickness of said closure member sealing portion of the sealing member contained therein whereby said sealing member may move bodily therein a substantial distance in a direction generally transversely of the plane of the closure member.

14. A butterfly valve comprising a body having a bore therethrough, a closure member within said bore, means for rotating said member to bore opening and bore, closing positions, a continuous and flexible circular sealing member formed of sheet material and mounted loosely on said closure member so as to be bodily shiftable thereon in radial directions for self alignment within said bore, said sealing member including an outer rim extending generally transversely of the plane of the closure member and adapted to sealingly engage said bore when said closure member is in bore closing position and an inner annular closure member sealing portion, and means for establishing a seal between the closure member sealing portion of said sealing member and said closure member to prevent the passage of fluid therebetween, said closure member being provided with an annular groove at its outer periphery, said sealing member being within said groove with said rim extending therefrom, said groove being at least several times wider than the thickness of said closure member sealing portion of the sealing member contained therein, said sealing means including a separate packing ring within said groove in sealing contact with the closure member sealing portion of said sealing member and at least one wall of the groove, and said packing ring being deformable to permit bodily movement of said sealing member within said groove whereby said rim may move bodily a substantial distance in a direction generally transverse to the plane of the closure member.

15. A butterfly valve comprising a body having a bore therethrough, a closure member within said bore, means for rotating said member to bore opening and bore closing positions, a continuous and flexible circular sealing member formed of sheet material and mounted loosely on said closure member so as to be bodily shiftable thereon in radial directions for self alignment within said bore, said sealing member including an outer rim extending generally transversely of the plane of the closure member and adapted to sealingly engage said bore when said closure member is in bore closing position and an inner annular closure member sealing portion, and means for establishing a seal between the closure member sealing portion of said sealing member and said closure member to prevent the passage of fluid therebetween, said closure member having a groove at its periphery, said rim being part of a convolution having an open end and a closed end formed in the sealing member, a side wall of the groove being opposite said closed end and initially spaced therefrom a substantial distance and said sealing means being deformable whereby said rim and convolution may move bodily a substantial distance with respect to said closure member in a direction transverse to the plane of said closure member, and said closed end is engageable with said groove side wall to limit said transverse movement.

16. A butterfly valve comprising a body having a bore therethrough, a closure member within said bore, means for rotating said member to bore opening and bore closing positions, a continuous flexible sealing member of sheet material loosely mounted on said closure member for bodily movement in radial and transverse directions with respect to said closure member, said sealing member having an initial diameter slightly greater than the diameter of said bore and being radially contracted by the bore into sealing engagement therewith when the closure member is in bore closing position, and means for establishing a seal between said sealing member and said closure member to prevent the passage of fluid therebetween.

17. A butterfly valve comprising a body having a bore therethrough, a closure member within said bore, means for rotating said member to bore opening and bore closing positions, said closure member having a groove at its periphery, a continuous flexible sealing member of sheet material loosely mounted within said groove for bodily movement in radial and transverse directions with respect to said closure member, said sealing member having an initial diameter slightly greater than the diameter of said bore and being radially contracted by the bore into sealing engagement therewith when the closure member is in bore closing position, means for establishing a seal between said sealing member and said closure member to prevent the passage of fluid therebetween, said transverse body movement of the sealing member being limited by contact with the walls of the groove.

18. A butterfly valve comprising a body having a bore therethrough, a closure member within said bore, means for rotating said member to bore opening and bore closing positions, a continuous flexible sealing member of sheet material loosely mounted on said closure member for bodily movement in radial and transverse directions with respect to said closure member, said sealing member having an initial diameter slightly greater than the diameter of said bore and being radially contracted by the bore into sealing engagement therewith when the closure member is in bore closing position, means for establishing a seal between said sealing member and said closure member to prevent the passage of fluid therebetween, said sealing member including a flat annular surface facing downstream against which said seal means normally engages whereby radial shifting of the sealing member is unrestricted.

19. A valve comprising: a housing formed to include a fluid passage; a valve seal support pivotally mounted in said housing, said support containing a peripheral channel; packing means disposed at one side of said channel; and a flexible continuous annular convoluted seal member disposed adjacent said packing means in said channel and supported for lateral movement relative to said support toward and away from the wall of said passage, said support, said packing means and said seal cooperating to close said passage against the flow of fluid therethrough.

20. A valve comprising: a housing forming a fluid passage; support means mounted for pivotal movement in said housing, said support means having a peripheral channel; and a flexible continuous annular seal member disposed in said peripheral channel for lateral movement relative to said support means toward and away from the wall of said passage, said seal member having a convoluted rim portion for engagement with the wall of said fluid passage to prevent fluid flow through said passage.

21. In a butterfly valve, the combination comprising: a housing forming a fluid passage; a butterfly element supported in said housing for pivotal movement to open and close said passage, said element having a pair of complementary divisions with opposed surfaces spaced when the divisions are assembled to provide a channel opening toward the periphery of the butterfly element; seal means disposed in said channel for movement edgewise relative to said butterfly element, said seal means being a continuous annular piece of flexible sheet material with the peripheral edge curled into a rim of semitoroidal cross section, the open side of said rim facing upstream of said fluid passage when the valve is closed; and a second surface on the division of said butterfly element at the downstream side of said seal means, said second surface being located for engagement by the closed side of the seal rim.

22. A butterfly valve comprising a valve body having therein a flow passage and an annular recess about this flow passage, a closure member pivotally mounted in the valve body with its axis of roatation extending across the longitudinal axis of said flow passage and offset in relation to said recess, a continuous seating ring mounted in said recess so as to be capable of radial movement and to accept as an interference fit a part of the periphery of the closure member thereby to seal the flow passage, said recess being sufficiently wide to provide predetermined axial clearance between said seating ring and the radial side walls of said recess, and a continuous sealing ring mounted between adjacent surfaces of the seating ring and the recess so as to engage a continuous outer portion of the seating ring and to seal the radial gap between said seating ring and recess while permitting radial movement of the seating ring in the recess.

References Cited by the Examiner

UNITED STATES PATENTS

| | | | |
|---|---|---|---|
| 1,616,672 | 2/1927 | Wilson | 251—333 |
| 1,671,069 | 5/1928 | De Wein | 251—175 X |
| 1,858,587 | 5/1932 | Grant | 251—306 |
| 2,054,064 | 9/1936 | Anderson | 251—306 |
| 2,816,729 | 12/1957 | Jensen | 251—306 X |
| 2,886,283 | 5/1959 | Natho | 251—175 |
| 2,910,266 | 10/1959 | Condello | 251—305 X |
| 2,934,312 | 4/1960 | Stevens | 251—306 X |

FOREIGN PATENTS

| | | |
|---|---|---|
| 689,630 | 1953 | Great Britain. |
| 753,860 | 1956 | Great Britain. |
| 782,911 | 1957 | Great Britain. |

ISADOR WEIL, *Primary Examiner.*

M. CARY NELSON, *Examiner.*

R. GERARD, D. ROWE, *Assistant Examiners.*